United States Patent
Lewis et al.

(10) Patent No.: US 6,196,004 B1
(45) Date of Patent: Mar. 6, 2001

(54) METHOD AND APPARATUS FOR CONDENSING BOTH WATER AND A PLURALITY OF HYDROCARBONS ENTRAINED IN A PRESSURIZED GAS STREAM

(76) Inventors: W. Stan Lewis; Roderick L. Lindberg, both of 201 E. Broadway, Vista, CA (US) 92084

( * ) Notice: Subject to any disclaimer, the term of this patent is extended or adjusted under 35 U.S.C. 154(b) by 0 days.

(21) Appl. No.: 09/285,704

(22) Filed: Apr. 5, 1999

(51) Int. Cl.[7] .................. F25B 9/02; F25J 3/00
(52) U.S. Cl. .................................. 62/5; 62/617
(58) Field of Search .................. 62/5, 617, 618, 62/619

(56) References Cited

U.S. PATENT DOCUMENTS

| | | |
|---|---|---|
| 1,952,281 | 3/1934 | Ranque . |
| 2,475,255 | 7/1949 | Rollman . |
| 2,522,787 | 9/1950 | Hughes . |
| 2,528,028 | 10/1950 | Barry . |
| 2,683,972 | 7/1954 | Atkinson . |
| 2,907,174 | 10/1959 | Hendal . |
| 3,296,807 | * 1/1967 | Fekete ............................ 62/5 |
| 3,775,988 | 12/1973 | Fekete . |
| 3,815,375 | * 6/1974 | Inglis .............................. 62/5 |
| 4,026,120 | * 5/1977 | Tallant ............................ 62/5 |
| 4,257,794 | 3/1981 | Shirokov . |
| 5,860,296 | * 1/1999 | Mostello ....................... 62/643 |

* cited by examiner

*Primary Examiner*—William Doerrler
(74) *Attorney, Agent, or Firm*—Tom Hamill, Jr.

(57) ABSTRACT

A method and apparatus for condensing water and a plurality of hydrocarbons entrained in a pressurized gas stream leaving a separator at a well location. The pressurized gas stream leaves the separator during a first time period and enters the vortex tube. Through the cooling action of the vortex tube, a first plurality of hydrocarbons and water are condensed and sent to a first reservoir. The temperature in the vortex tube is not low enough to condense a second plurality of hydrocarbons, which remain in the gaseous state and are sent to a second reservoir for sale. Through the warming action of the vortex tube, methane, ethane, propane and some butane may immediately be passed to a gas sales line. The pressurized gas stream is terminated during the well recharge phase. This termination period occurs for a second time period. The ratio of the second time period to the first time period is chosen to be greater than zero.

8 Claims, 2 Drawing Sheets

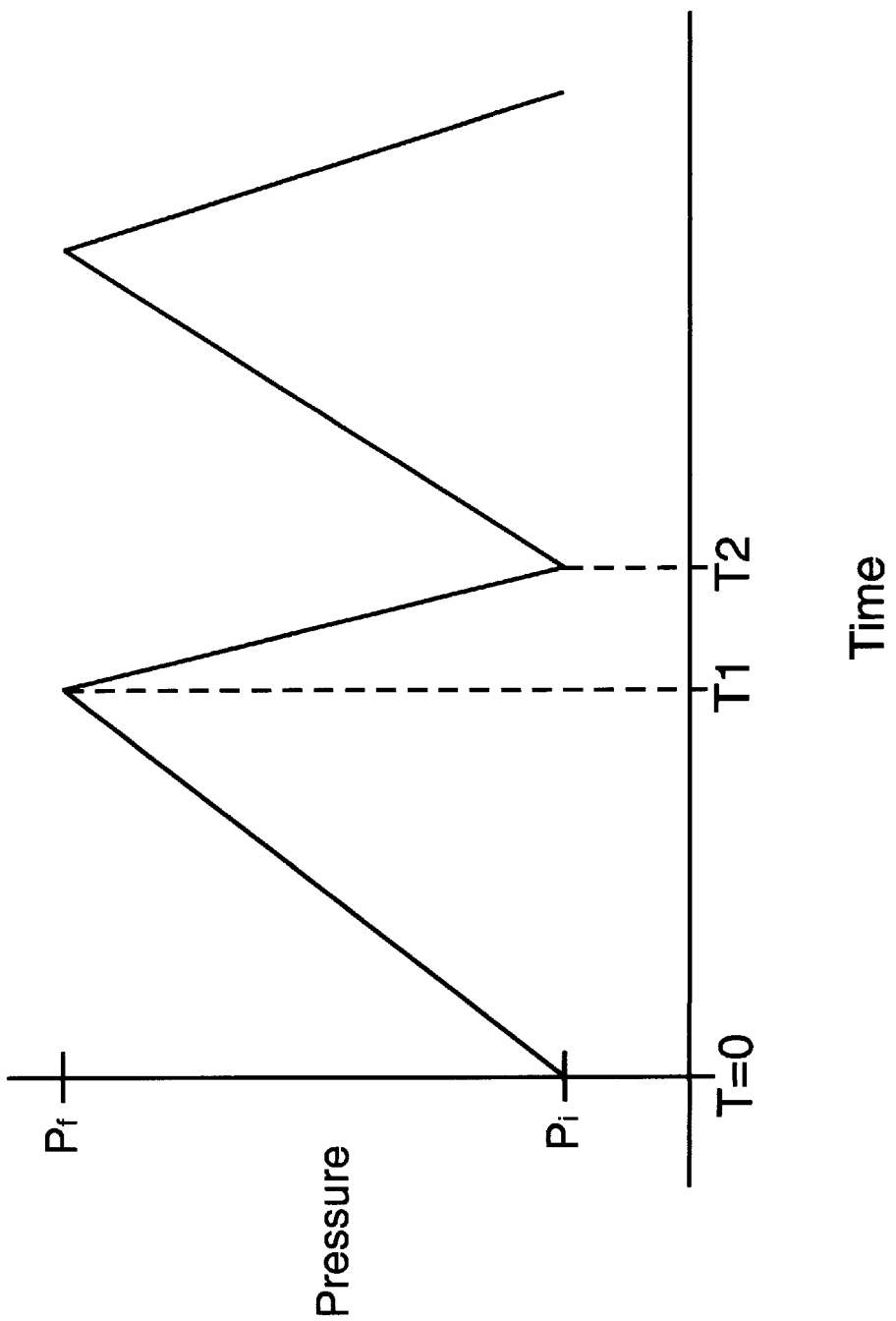

METHOD AND APPARATUS FOR CONDENSING BOTH WATER AND A PLURALITY OF HYDROCARBONS ENTRAINED IN A PRESSURIZED GAS STREAM

BACKGROUND OF THE INVENTION

1. Field of the Invention

The present invention relates generally to employing a vortex tube to condense hydrocarbons and water, and more particularly, to a simple method and apparatus to permit preliminary separation of hydrocarbons and water from a pressurized gas stream leaving a separator at a well location.

2. Description of the Prior Art

Various applications of both the heating and cooling aspects of the vortex tube are known in the art. The current invention discloses a method and apparatus for condensing water and a plurality of hydrocarbons entrained in a pressurized gas stream leaving a separator at a well location. The pressurized gas stream leaves the separator during a first time period and enters the vortex tube. Through the cooling action of the vortex tube, a first plurality of hydrocarbons and water are condensed and sent to a first reservoir. The temperature in the vortex tube is not low enough to condense a second plurality of hydrocarbons, which remain in the gaseous state and are sent to a second reservoir for sale. The pressurized gas stream is terminated during the well recharge phase. This termination period occurs for a second time period. The ratio of the second time period to the first time period is generally chosen to be greater than unity (one), although it may be greater than zero.

During the well recharge phase, the vortex tube is not being employed. However, other actions are occurring. The use of a vortex tube in low pressure gas stream and a method to cyclically operate the same has not been contemplated by the prior art.

So, although the vortex tube has been employed in oil well applications, no prior art provides for its cyclical use, being on during the well flow phase and being discontinued during the well recharge phase. Other advantages of the present invention over the prior art also will be rendered evident.

SUMMARY OF THE INVENTION

Gas wells which produce relatively small amounts of liquids are abundant in the United States. These wells are characterized by a low head pressure, typically 200 psi or less, and employs a lift pump or a plunger lift to bring the gas, water, and liquid hydrocarbons to the surface. Once brought to the surface, this mixture is field processed. Once the mixture is field processed, the various components are sold. Wells of this type constitute the great majority of oil wells. These wells have a general property where the well pressure will not exceed an upper pressure, regardless of how long the valve which empties the well itself is closed.

Generally speaking, there are two common methods for producing salable gas and oil. The first type are wells which employ a lift pump. The lift pump is a device which pumps oil and gas through the well's tubing until a specified final pressure is achieved at the casing head. When this specified final pressure is achieved, the oil and gas are permitted to flow to the field processing devices which produce salable gas and oil. The specified final pressure is generally achieved after a certain number of lift cycles occur during a certain period of time.

The second type of well employs a plunger lift. The plunger lift is a device which operates as a natural pump. When the plunger is closed, pressure builds up in the casing naturally as a function of time based on sub-surface reservoir pressure. A plunger is opened when a specified final pressure is achieved in the casing. When the plunger is opened gas and oil are permitted to flow to the field processing devices which produce salable gas and oil. This specified final pressure is also generally achieved after a certain time period.

Both of these common well types share that characteristic that they start at an initial pressure and proceed to a specified final pressure during a certain time interval. After the specified time interval, the well unloads and gas and liquids are allowed to flow. The period of time in which both of these common well types flow is generally constant. The specified final pressure may be ascertained by a pressure transducer. Field operations most often employ a simple timer, as well recharge and discharge characteristics are well known.

During the flow phase, the mixture of gas, hydrocarbons, and water flow through a pipe from the well to a field processing apparatus. Post processed products are routed to a gas purchasers sales line, and waste products are stored for remediation.

Current field processing techniques generally involve a two step process. First, oil and water separation, and second, further treatment for the removal of any remaining water prior to the introduction of the gasses to the sales line as follows. Initially, the gas stream flows from the well into a separator. Oil and water generally condense into liquid as the gas stream expands from the well head into the larger volume of the separator. The resultant mixture of oil and water separate due to their different densities, and are routed to separate holding tanks, one for the crude oil and one for the water. The crude oil is sold, and the water is remediated or disposed of in an environmentally responsible fashion. A second step treats the mixture of natural gasses which do not condense in the separator. The gasses pass to a heat treatment device which elevates the gas temperature. This separates the gas mixture from the water vapor. Whether or not this processing step is employed is determined by the amount of water vapor present in the separator gas effluent. The water free gas mixture is then routed directly to the gas sales line.

The instant invention is directed to a method of cycling the pressurized gas stream from the separator into a vortex tube to permit further condensation of hydrocarbons as well as any water which may be present in certain time ratios based on the time the well takes to recharge, and the flow time of the well. It includes a separator, the separator having a valved entrance connected to the well and three valved exits. During the time period when the well flows, the first valve is opened and the mixture from the well enters the separator. Again, oil and water generally condense into liquid as the gas stream expands from the well head into the larger volume of the separator. The resultant mixture of oil and water separate due to their different densities. A first valved exit would open and route the noncondensed gasses into the vortex tube. Once the well stops flowing and enters its recharge phase, this valve will close. A second valved exit would open and route the crude oil to a crude oil reservoir. A third valved exit would open and route the liquid water to a water holding reservoir.

During the period of time when the first valved exit is open, the pressurized gas stream leaves the separator, and enters the vortex tube. The vortex tube has two exits. A first exit is considered to be the cold exit. A second exit is considered to be the hot exit. By the cooling action of the vortex tube, a plurality of hydrocarbons with a temperature of condensation below that developed by the vortex tube will condense. These fluids will be routed into an intermediate crude oil holding tank or reservoir through the first exit.

This reservoir will include an valved entrance and four valved exits. The valved entrance will permit the condensates and any cold gasses to enter the reservoir during the flow phase of the well. After the flow phase, condensates again will separate according to their different densities. A first valved exit will open and permit the cooled gasses to pass to the gas sales line. During this time period, the well is recharging and the mixture present in this reservoir begins to warm. A second valved exit will open and permit butane which has returned to the gaseous state to be collected in a butane reservoir. This valve will remain open for a time period. A butane compressor may be employed in some applications. After the time period, this valve will close. A third valved exit routes the fluid hydrocarbons to the crude oil holding tank. A fourth valved exit will route the waste water to the water holding tank.

A second plurality of hydrocarbons whose temperature of condensation is above that developed by the vortex tube will not condense and will remain in their gaseous state. These gasses include methane, ethane, propane and may include some butane. These gasses are routed directly to the gas sales line or to an intermediate holding reservoir proximal the gas sales line through the second vortex tube exit.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a method and apparatus for condensing water and a plurality of hydrocarbons entrained in a pressurized gas stream leaving a separator at a well location which includes cycling the pressurized gas flow through the vortex tube.

It is a further object of the present invention to provide a method and apparatus for condensing water and a plurality of hydrocarbons entrained in a pressurized gas stream leaving a separator at a well location in which the vortex tube is employed only during the well flow phase and is discontinued during the well recharge phase.

It is a further object of the present invention to provide a method and apparatus for condensing water and a plurality of hydrocarbons entrained in a pressurized gas stream leaving a separator at a well location which permits the collection of gaseous hydrocarbons which normally would be burned or flared at said well location.

It is a further object of the present invention to provide a method and apparatus for condensing water and a plurality of hydrocarbons entrained in a pressurized gas stream leaving a separator at a well location which would permit the well owner to retain salable condensates that would normally be collected at drip zones located on the gas purchasers sales line.

It is a further object of the present invention to provide a method and apparatus for condensing water and a plurality of hydrocarbons entrained in a pressurized gas stream leaving a separator at a well location which will permit the separation of butane in an essentially pure form at the well location.

It is a further object of the present invention to provide a method and apparatus for condensing water and a plurality of hydrocarbons entrained in a pressurized gas stream leaving a separator at a well location which may be easily adapted from its present configuration to the new configuration employing the vortex tube.

Additional objects, advantages and novel features of the invention will be set forth in part in the description that follows, and in part will become apparent to those skilled in the art upon examining the following or may be learned by practice of the invention. These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 2 is a graph showing the recharge and flow characteristics of an ordinary lift type well with respect to pressure and time.

DESCRIPTION OF THE PREFERRED EMBODIMENT

Figure 1:
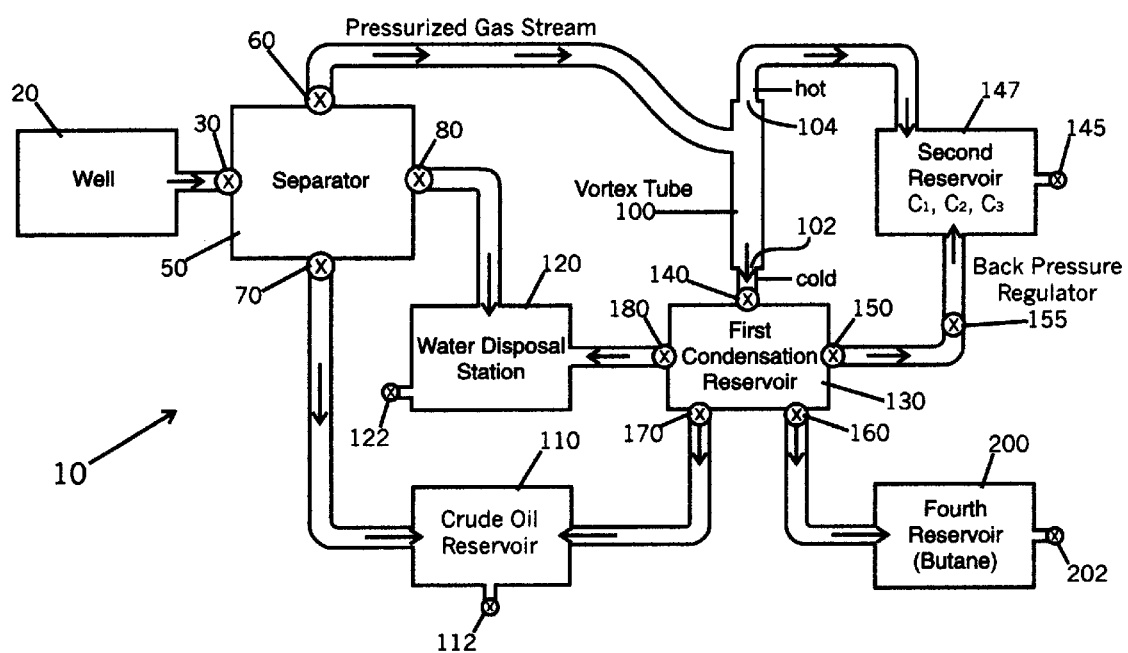
FIG. 1 is a schematic diagram of field processing devices which implements the method for condensing water and a plurality of hydrocarbons entrained in a pressurized gas stream leaving a separator at the well location.

With reference now to the drawings, a method and apparatus for condensing water and a plurality of hydrocarbons entrained in a pressurized gas stream leaving a separator at a well location embodying the principles and concepts of the present invention will be described.

Turning initially to FIG. 1, there is shown a schematic of the invention being employed in a field processing unit 10.

Cyclical well 20 is typical in that it includes a recharge time and a flow time. During the flow time, a mixture of a plurality of liquid hydrocarbons, water, and other gasses flow from the well 20 into the separator 50. For purposes of this discussion, the well output will be defined to be the mixture. The separator 50 has a valved entrance 30 connected to the well 20 and a first valved exit 60, a second valved exit 70 and a third valved exit 80. During the time period when the well 20 flows, the valved entrance 30 is opened and the mixture from the well enters the separator 50. Again, oil and water generally condense into liquid as the entrained gas stream mixture expands from the well head into the larger volume of the separator 50. The resultant mixture of oil and water separate due to their different densities. A first valved exit 60 would open and route the non-condensed gasses into the vortex tube 100. Once the well stops flowing and enters its recharge phase, the first valved exit 60 will close. A second valved exit 70 would open and route the crude oil to a crude oil reservoir 110. A third valved exit 80 would open and route the liquid water to a water holding/disposal reservoir 120. The first, second and third valved exits (60, 70, 80) would operate sequentially based on information provided by a pressure transducer, timer or other well known sensor.

During the period of time when the first valved exit 60 is open, the pressurized gas stream leaves the separator 50, and enters the vortex tube 100. The vortex tube 100 has a first exit 102 and a second exit 104. The first exit 102 is considered to be the cold exit. The second exit 104 is considered to be the hot exit. By the cooling action of the vortex tube 100, a plurality of hydrocarbons with a temperature of condensation below that developed by the vortex tube 100 will condense. These fluids will be routed into an intermediate crude oil holding tank or first condensation reservoir 130 through the first exit 102. By the heating action of the vortex tube 100, a plurality of hydrocarbons will remain in the gaseous state and be routed to the gas sales line 145. This gas sales line 145 is expressed as being proximal to a second reservoir 147 which is an optional component. These gases include methane, ethane, propane and some isomers of butane, as well as traces of higher hydrocarbons.

The first condensation reservoir 130 will include a valved entrance 140 and first valved exit 150, a second valved exit 160, a third valved exit 170 and a fourth valved exit 180. The valved entrance 140 will permit the condensates and any cold gasses to enter the reservoir during the flow phase of the well. After the flow phase, valved entrance 140 closes and the condensates again will separate according to their different densities. A first valved exit 150 will open and permit the cooled gasses to pass to the gas sales line 145. This gas sales line 145 is expressed as being proximal to a second reservoir 147 which is an optional component. The condensates will include the higher order hydrocarbons, butane, pentane, hexane, heptane, octane and the subsequent higher order hydrocarbons. During this time period, the well is recharging and the mixture present in this reservoir begins to warm. A second valved exit 160 will open and permit butane which has returned to the gaseous state to be collected in a butane reservoir 200. The second valve 160 will remain open for a time period. After the time period, the second valve 160 will close. A third valved exit 170 routes the fluid hydrocarbons to the crude oil holding tank 110. A fourth valved exit 180 will route the waste water to the water holding tank 120.

The butane reservoir 200 has an exit port 202 to permit the essentially pure butane to be evacuated and sold. The butane reservoir 200 may have an initial negative pressure. It has further been considered that a butane compressor be employed.

A back pressure regulator 155 may be provided intermediate the first condensation reservoir 130 and the sales line 145.

The water disposal reservoir 120 also includes an exit port 122. This will permit the water disposal reservoir 120 to be emptied and the contents remediated or disposed of in an environmentally friendly fashion.

The crude oil reservoir 110 also includes an exit port 112. This will permit the liquid hydrocarbons which have been separated from the mixture to be evacuated and sold.

The pressurized gas stream from the separator 50 enters the vortex tube 100 during the flow phase of the well 20 for a first time period. The recharge period of the well 20 is determined to be a second time period. During this second time period, no gases enter the vortex tube 100. The ratio of the second time period to the first time period is desired to be greater than one, and certainly greater than zero. That is the ratio of the well recharge time period where there is no flow to the vortex tube 100 to the well flow time period where there is flow through the vortex tube 100 is greater than one and certainly greater than zero. It has been determined that by employing the instant method on wells that the production of salable components by the owner is significantly increased.

Referring now specifically to FIG. 2, a graph of well pressure vs. time is shown. At time=$T_0$, the well is at an initial pressure $P_i$. As time increases, the well pressure increases. At time=$T_1$ the well pressure reaches a final pressure $P_F$. It is at the final pressure that the well is sufficiently charged to permit mixture flow. The well flow phase occurs between time=$T_1$ and time=$T_2$. At time=$T_2$ the well has discharged, and the mixture flow stops. Then the well cycle begins again. The well flow time ($T_f$=$T_2$-$T_1$) for purposes of the claims of the instant invention is deemed to take place during a first time period, that is the time period that the gasses are actually passing through the vortex tube 100. The well recharge time ($T_R$=$T_1T_0$) for purposes of the claims of the instant invention is deemed to take place during a second time period, this time period being that when the well pressure is recharging.

The ratio ($T_R/T_f$)>1 has been found to permit the isolation of butanes at the well processing site. Even more broadly, the ratio ($T_R/T_f$)>0 has also been found to permit the isolation of butanes at the well processing site. This is in addition to the increased production of the well, combined with the fact that the additional production is prior to the salable components being delivered to a gas company.

It will be clear to those skilled in the art that optimal heat transfer efficiency for a vortex tube is achieved at certain pressure and flow conditions. Hence, a plurality of vortex tubes may be employed which are switched into the flow at specific time and/or pressure intervals according to the well's time base. Switching is accomplished using standard check valves or float valves.

It is apparent from the above that the present invention accomplishes all of the objectives set forth by providing a method and apparatus for condensing water and a plurality of hydrocarbons entrained in a pressurized gas stream leaving a separator at a well location which includes cycling the pressurized gas flow through the vortex tube.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed is:

1. A method for condensing water and a first plurality of hydrocarbons entrained in a pressurized gas stream leaving a cyclic well, said method including the steps of:
   a) affixing a vortex tube to said pressurized gas stream leaving a first exit port from a separator,
   b) permitting said pressurized gas stream to flow through said vortex tube for a first time period, said stream exiting said vortex tube on a cold side and a hot side, said cold side in communication with a first reservoir, said hot side in communication with a second reservoir,
   c) precipitating a first plurality of hydrocarbons, including butane, pentane, hexane, heptane and octane during said first time period in said first reservoir,
   d) collecting a second plurality of hydrocarbons, including methane, ethane, propane and butane during said first time period in said second reservoir,
   e) discontinuing the flow of the pressurized gas stream through said vortex tube when the pressure of the pressurized gas stream reaches a predermined minimum value, the flow being discontinued for a second time period, wherein
   said first time period is the time for the well to depressurize and said second time period is the time for the well to recharge, the ratio of said second time period to said first time period is greater than unity.

2. The condensation method as claimed in claim 1 wherein water further condenses out of the pressurized gas stream passing through said vortex tube during said first time period, said water is also routed to said first condensate reservoir.

3. The condensation method as claimed in claim 2 wherein said water is routed from said first reservoir to a water disposal station.

4. The condensation method as claimed in claim 3 wherein said separator further includes a second exit port in communication with a crude oil reservoir, permitting hydrocarbons which condense in said separator to be transported to said crude oil reservoir, said hydrocarbons located in said crude oil reservoir being in a state to be sold.

5. The condensation method as claimed in claim 4 wherein said separator includes a third exit port in communication with said water disposal station, permitting water which condenses in said separator to be transported to a water disposal station.

6. The condensation method as claimed in claim 5 wherein said first plurality of hydrocarbons are routed from said first reservoir to said crude oil reservoir, said first plurality hydrocarbons being in a state to be sold.

7. The condensation method as claimed in claim 6 wherein said first reservoir includes a gas exit port, said gas exit port is in communication with a fourth reservoir, said gas exit port is opened during said second time period, said gas exit port is closed during said first time period, during said second time period said gas exit port permitting essentially pure butane to be routed to said fourth reservoir, said essentially pure butane being in a state to be sold.

8. The condensation method as claimed in claim 7 wherein a back pressure regulator is located intermediate said first condensate reservoir and said second condensate reservoir.

* * * * *